United States Patent
Weber

(10) Patent No.: US 12,278,534 B2
(45) Date of Patent: Apr. 15, 2025

(54) STATOR FOR AN ELECTRIC MACHINE AND METHOD FOR APPLYING A HAIRPIN WINDING TO A STATOR BODY

(71) Applicant: AUDI AG, Ingolstadt (DE)

(72) Inventor: Korbinian Weber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 189 days.

(21) Appl. No.: 17/921,433

(22) PCT Filed: Apr. 29, 2021

(86) PCT No.: PCT/EP2021/061224
§ 371 (c)(1),
(2) Date: Oct. 26, 2022

(87) PCT Pub. No.: WO2022/002460
PCT Pub. Date: Jan. 6, 2022

(65) Prior Publication Data
US 2023/0163650 A1    May 25, 2023

(30) Foreign Application Priority Data
Jun. 30, 2020    (DE) ............. 10 2020 117 153.6

(51) Int. Cl.
*H02K 3/12* (2006.01)
*H02K 3/28* (2006.01)

(52) U.S. Cl.
CPC ............ *H02K 3/28* (2013.01); *H02K 3/12* (2013.01)

(58) Field of Classification Search
CPC .. H02K 3/00; H02K 3/04; H02K 3/12; H02K 3/24; H02K 3/28
See application file for complete search history.

(56) References Cited

U.S. PATENT DOCUMENTS

| | | | |
|---|---|---|---|
| 7,005,772 B1 | 2/2006 | Frederick et al. | |
| 2003/0230949 A1* | 12/2003 | Ogawa | H02K 3/12 310/180 |
| 2014/0319953 A1 | 10/2014 | Rahman et al. | |
| 2015/0076953 A1 | 3/2015 | Tamura | |

(Continued)

FOREIGN PATENT DOCUMENTS

| | | |
|---|---|---|
| DE | 102016118871 A1 | 4/2018 |
| DE | 112017003574 T5 | 4/2019 |

(Continued)

OTHER PUBLICATIONS

Examination Report issued on Feb. 18, 2021, in corresponding German Application No. 10 2020 117 153.6, 14 pages.

(Continued)

*Primary Examiner* — Tran N Nguyen
(74) *Attorney, Agent, or Firm* — Maier & Maier, PLLC

(57) ABSTRACT

A stator for an electric machine having a stator body and an applied hairpin winding and having conductors for a plurality of phases. A respective pole of the respective phase is formed by a plurality of groups of groove portions each of which including groove portions which are arranged in a group of grooves of adjacent grooves in the same layer of the hairpin winding, the conductor clips which form the groove portions of the respective group of groove portions, form a group of conductor clips connecting adjacent poles of the respective phase.

11 Claims, 2 Drawing Sheets

(56) References Cited

U.S. PATENT DOCUMENTS

2016/0248289 A1 8/2016 Tamura
2020/0052562 A1 2/2020 Neet

FOREIGN PATENT DOCUMENTS

DE 102018206003 A1 10/2019
DE 102018125830 A1 4/2020

OTHER PUBLICATIONS

International Preliminary Report on Patentability issued on Mar. 16, 2022, in corresponding International Application No. PCT/EP2021/061224, 14 pages.
Riedel et al., "Challenges of the hairpin technology for production techniques", 2018 21st International Conference on Electrical Machines and Systems (ICEMS), Oct. 7-10, 2018, pp. 2471-2476.
International Search Report and Written Opinion issued on Jul. 30, 2021, in corresponding International Application No. PCT/EP2021/061224, 14 pages.

* cited by examiner

STATOR FOR AN ELECTRIC MACHINE AND METHOD FOR APPLYING A HAIRPIN WINDING TO A STATOR BODY

FIELD

The invention relates to a stator for an electric machine having a stator body with a plurality of grooves distributed in the circumferential direction of the stator body, and a hairpin winding applied to the stator body and having conductors for a plurality of phases, the conductors each being formed by a plurality of conductively connected conductor clips, each of which having two groove portions which are connected by a connecting portion, wherein a respective pole of the respective phase is formed by a plurality of groups of groove portions each of which comprising groove portions which are arranged in a group of grooves of adjacent grooves in the same layer of the hairpin winding, wherein the conductor clips, which form the groove portions of the respective group of groove portions, form a group of conductor clips which connects adjacent poles of the respective phase, in that the connecting portions of the conductor clips in each case connect groove portions which belong to groups of groove portions of adjacent poles of the respective phase, wherein between the groove portions of the respective conductor clip there are, in the circumferential direction, a number of skipped grooves which are specified by a skip width defined by the clip shape of the respective conductor clip. In addition, the invention relates to an electric machine, a motor vehicle and a method for applying a hairpin winding to a stator body.

BACKGROUND

Stators for electric machines in hairpin construction are nowadays often found in drive machines, particularly in the automotive sector. With this production technique, a profile wire, usually a rectangular wire, is first bent into a U-shape, which can also be referred to as a conductor clip or "hairpin". The legs of this hairpin are then arranged in a circle and inserted into the grooves of a laminated stator core. In the next step, the free ends of the legs are twisted concentrically about the stator axis by a defined angle on the rear side of the stator, with all free ends that are on a certain diameter, i.e. on one layer of the winding, being twisted alternately clockwise and counterclockwise. This process is also known as "twisting". Free ends that come to rest next to each other due to the twisting are welded and, depending on the winding scheme, so-called interconnecting bridges are placed on the winding head and welded to the free ends in order to connect the conductor clips to form an overall winding. Optionally, the free ends are then insulated and the entire stator is impregnated. This technology can be highly automated and achieves a high copper fill factor, i.e. a high ratio of the area covered by the conductor to the groove area. It is therefore particularly suitable for the manufacture of electric machines in the automotive sector, in particular for the manufacture of drive units.

A disadvantage of the approach described can be that the winding scheme is generally predefined once production has been set up. However, if motors are to be produced for different performance or torque classes, for example, it is a common and economically favorable solution to implement this variation by varying the axial length of the electric machine and thus of the stator. However, in order to keep the electrical boundary conditions the same within the framework of a modular system, the number of windings of the stator should be adjusted if the length of the motor is varied. The conventional hairpin winding technology offers hardly any possibilities to change the number of turns without setting up a separate production facility for each motor with its own semi-finished products and/or tools.

SUMMARY

Therefore, it is the object of the invention to avoid the disadvantages of conventional hairpin windings and, in particular, to make it possible to adapt the number of turns with as few modifications as possible to the production process.

The object is achieved in that at least two of the groups of conductor clips of the respective phase have a different variation or combination of skip widths of the conductor clips of the respective group of conductor clips.

With conventional windings, the same combinations or variations of skip widths are utilized for all poles and all group of grooves of the individual poles. For example, the same skip width can be utilized for all conductor clips, or the same sequence of skip widths for the individual conductor clips can be used for each of the group of grooves. This results in a high symmetry of the winding or a highly symmetrical winding head.

In the context of the invention, it was recognized that even a relatively small deviation from this symmetry, for example by modifying the groups of groove portions of a pole or two poles of a respective phase, by using a different variation or combination of skip widths for at least one group of conductor clips than for other groups of conductor clips, a significant modification of the winding, so for example a change from a previous parallel connection of conductor portions of a phase to a series connection of these conductor portions and thus, for example, a variation of the number of turns of the respective phase can be achieved. At the same time, the grooves occupied by the groove portions of the modified group of conductor clips remain the same in the procedure according to the invention, so that apart from the use of differently shaped conductor clips, for example for one or two pole connections of a respective phase, the further winding scheme can remain unchanged. This makes it possible, for example, with relatively little technical effort to apply windings with a different number of turns using the same production line.

The grooves between two groups of grooves of one phase typically carry groove portions from conductors of other phases. The skip widths of the conductor clips must therefore be chosen so that at least these grooves can be skipped. If, for example, three phases and a size of the group of grooves of two are used, at least four grooves must be skipped over by a conductor clip of the respective group of conductor clips, i.e. a conductor clip must have a skip width of at least four. In this case, the remaining conductor clip of this group of conductor clips must also skip over the grooves occupied by groove portions of the first conductor clip, so that this one must have a skip width of six. Thus, in this case, one possible combination of skip widths is a skip width of four and a skip width of 6. The second possible combination in this case is a skip width of five for both conductor clips of the respective conductor bracket group. In this case, in a stator according to the invention, different groups of conductor clips would be utilized, of which at least one having the skip width combination of four and six and one exclusively utilizing a skip width of five.

As will be explained later using an example, by utilizing different variations or combinations of skip widths according to the invention, conductor portions of the respective phase, which would otherwise be connected in parallel, can be connected in series. As a result, a variation in the number of turns that can be implemented in a simple manner can be achieved. If groups of conductor clips with more than two conductor clips are utilized, there are obviously more different possible variations or combinations of skip widths, for which some more examples will be explained later.

In many winding schemes, a fixed group of grooves is assigned to a respective pole, so that the pole is formed by those groups of groove portions that are arranged in the various layers in this group of grooves. However, winding schemes are also known in which different groups of grooves are assigned to a pole in different layers, so that the different groups of groove portions that form the different layers of the pole can be slightly offset from one another in the circumferential direction, in particular by one or two grooves.

The respective phase can be formed by a single conductor. However, it can also comprise a plurality of conductors connected in parallel and/or in series, each of which being formed by a plurality of conductively connected, for example welded, conductor clips.

The groove portions of various ones of the conductor clips are each stacked in the grooves in such a way that the radial position of a respective one of the groove portions is defined by its position in the respective stack. In summary, all those groove portions that are arranged in the different grooves at the same radial position or at the same position in the respective stack are referred to as a layer.

In the case of hairpin windings, the conductor clips are typically arranged at a slight angle, so that the two groove portions of a conductor clip are arranged on different layers. Typically, the conductor clips are arranged in such a way that two layers are connected by connecting portions of the conductor clips and the connection to other layers is formed by conductively connected, for example welded, free ends of the groove portions of one or more of these conductor clips. The two layers connected by connecting portions are also referred to as a basket.

The terms variation and combination are used here in the sense of combinatorics. If only the order in which the skip widths occur is varied, for example starting from a first one of the conductor clips in a clockwise direction, this is a permutation or, in general, a variation of the skip widths. If the respective group of conductor clips comprises, for example, three conductor clips and three phases are utilized, an average skip width of eight is typically required. As different permutations or variations, on the one hand the skip widths nine, seven and eight and on the other hand the skip widths eight, nine and seven can be used. In the case of a combination, the order is irrelevant, so that the two aforementioned variations or permutations would be the same combination of skip widths. Thus, the skip widths of nine, nine and six on the one hand and the skip widths of ten, eight and six on the other hand could be used as different combinations of skip widths. These different combinations are also different variations, but not different permutations because different elements are used.

With regard to the number of possible variations, for the first one of the conductor clips of a group of conductor clips, for example the one of the conductor clips that occupies the first groove of the group of grooves in the first pole, the groove in the group of grooves of the second pole can be freely selected. This results in n possibilities for the skip width of the first conductor clip at a group size n of the group of conductor clips. There are n−1 possibilities for the second conductor clip, and n−3 possibilities for the third conductor clip, if any, etc. Thus, for a group of conductor clips of n conductor clips, there are n! possible variations. For example, there are exactly two possibilities for a group size of two conductor clips, six possibilities for a group size of three conductor clips and 24 possibilities for a group size of four conductor clips. The size of the group of conductor clips corresponds to the size of the respective group of grooves and is also referred to as the number of holes.

At least one conductor of at least one phase can be routed twice in the same direction about a central axis of the stator in the circumferential direction of the stator within a basket of the hairpin winding formed by two layers of the hairpin winding. In particular, the conductor in each of the baskets, i.e. in each pair of adjacent layers which are connected by connecting portions, can be routed twice in the same direction about the central axis of the stator.

With conventional winding schemes, a change to another basket takes place after one cycle. If a winding is now utilized in which a plurality of parallel conductors of a phase are formed by the conductor clips, this winding can, as will be explained later with examples, by utilizing a different variation or combination of skip widths for a certain pole connection or a plurality of pole connections, be modified in such a way that the winding is routed several times about the central axis of the stator, as a result of which a change from parallel to series-connected conductor portions is possible with little effort by the variation according to the invention.

Only those selected groups of conductor clips that connect exactly two or exactly three of the poles of the respective phase can have a different variation or combination of skip widths than the other one of the groups of conductor clips of the phase. As a result, the symmetry of the winding, which is desirable in itself, is largely retained and there is only a slight local deviation in order to achieve the desired wiring variation.

All conductor clips of the selected groups of conductor clips can have the same skip width and the skip widths of two conductor clips of the other groups of conductor clips can differ by two in each case, or vice versa. If, for example, an average skip width n is required for the conductor clips of the group of conductor clips, all conductor clips for the selected groups of conductor clips can have the skip width n and for the other groups of conductor clips one of the conductor clips can have the skip width n+1 and one of the conductor clips can have the skip width n−1. If more than two conductor clips are contained in the respective group of conductor clips, the remaining conductor clips can in turn have the skip width n. As a result, the positions of two groove portions in the respective group of grooves are swapped by the different combination of skip widths for the selected groups of conductor clips, compared to a winding in which such a modification would not take place, which can make it possible, for example, to connect strings in series or similar which strings are connected parallel without this modification.

In cases where the respective group of conductor clips comprises at least three conductor clips in each case, the skip widths of two conductor clips in the selected group of conductor clips can differ by four or more and the skip widths of the conductor clips in the other groups of conductor clips can differ by a maximum of three, or vice versa. For example, if three conductor clips per group of conductor clips and three phases are utilized, the average skip width of the groups of conductor clips can be equal to eight. In this case, for example, skip widths of ten, eight and six can be used for the selected groups of conductor clips, while skip widths of nine, nine and six can be used for the other groups of conductor clips. Similarly, as explained above, the other variation or combination achieves the effect that the groove portions in a specific group of grooves are arranged in a different order and thus conductor clips can be connected differently, for example to switch from a parallel connection of conductor portions to a series connection.

In addition to the stator according to the invention, the invention relates to an electric machine that comprises a stator according to the invention.

In addition, the invention relates to a motor vehicle that comprises an electric machine according to the invention, in particular as a drive motor.

The invention also relates to a method for applying a hairpin winding to a stator body having conductors for a plurality of phases as part of the manufacture of an electric machine, comprising the steps of:

providing a stator body having a plurality of grooves distributed in the circumferential direction of the stator body and a plurality of conductor clips, each having two groove portions which are connected by a connecting portion, with at least two of the conductor clips having a different clip shape, axially inserting the groove portions into the grooves in such a way that a respective pole of the respective phase is formed by a plurality of groups of groove portions which comprise groove portions which are arranged in a group of grooves of adjacent grooves in the same layer of the hairpin winding, the conductor clips which form the groove portions of the respective group of groove portions, form a group of conductor clips connecting adjacent poles of the respective phase in that the connecting portions of the conductor clips in each case connect groove portions which belong to groups of groove portions of adjacent poles of the respective phase, wherein between the groove portions of the respective conductor clip there are, in the circumferential direction, a number of skipped grooves which are specified by a skip width defined by the clip shape of the respective conductor clip, wherein a different variation or combination of skip widths of the conductor clips of the respective group of conductor clips is used for at least two of the groups of conductor clips of the respective phase, and conductively connecting the conductor clips to form the at least one conductor of the respective phase.

The method according to the invention can be used in particular for the production of a stator according to the invention or in the context of the manufacture of a stator according to the invention for applying the hairpin winding to the stator body. Features explained for the stator according to the invention can be transferred to the method according to the invention with the advantages mentioned, and vice versa.

The method steps can be repeated, in particular after the application of a first hairpin winding on a first stator body, to apply a second hairpin winding on a second stator body, wherein, however, the step of axially inserting the groove portions into the groove for applying the further hairpin winding is modified in such a way that for at least one of the groups of conductor clips of the respective phase, a different variation or combination of skip widths is used than is used for the first hairpin winding, and/or that for all groups of conductor clips of the respective phase in the further hairpin winding the same variation or combination of skip widths is used.

As already explained for the stator according to the invention, it can thus be achieved that, for example, in the first hairpin winding, the winding in the circumferential direction of the stator is routed twice in the same direction about the central axis of the stator within a basket, while in the second hairpin winding two conductor portions can result instead, which are routed within the basket only once in the same direction about the central axis of the stator in the circumferential direction of the stator before the respective conductors change to another basket. Expressed in general terms, the procedure described can result in a different number of turns for the first and second hairpin windings, particularly in the case of a manufacturing method that is the same apart from this small modification. This results in a considerable increase in flexibility in the manufacture of a stator.

The first and second stator body may have different lengths in the axial direction of the stator. As already explained above, different lengths of the electric machine and thus also of the stator body are utilized in order to be able to provide different power or torque in a modular system, for example in a series of a motor vehicle. The different configuration of the first and second hairpin windings enables the number of turns to be adapted to the electrical boundary conditions, so that the first and second stator bodies with windings or the electric machine comprising them can be utilized in the same series of vehicles without costly adaptation of the surrounding electrons, for example.

BRIEF DESCRIPTION OF THE FIGURES

Further advantages and details of the invention are shown in the following exemplary embodiments and in the associated drawings. Schematically.

DETAILED DESCRIPTION

Figure 1:
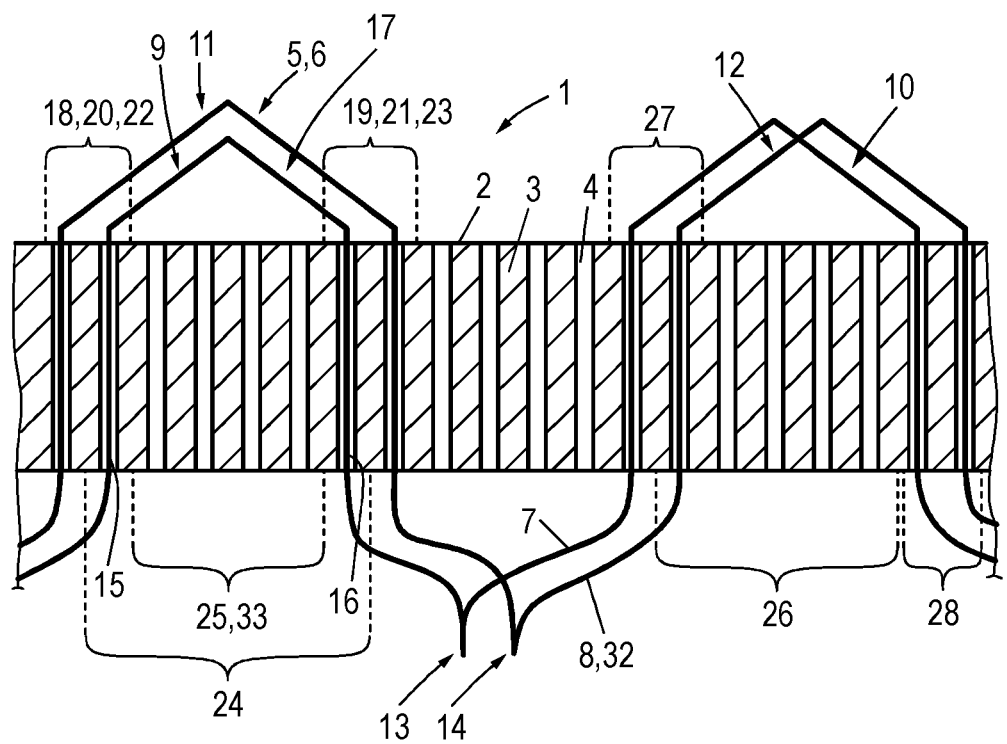
FIG. 1 shows a detailed view of an exemplary embodiment of a stator according to the invention, which can be manufactured by an exemplary embodiment of the method according to the invention.
Figure 2:
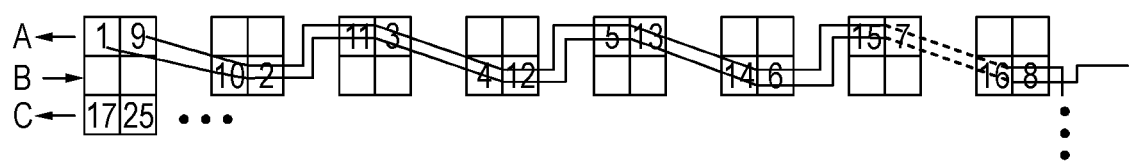
FIG. 2 shows a section of the winding scheme for the stator shown in FIG. 1.

FIG. 1 shows a detailed view of a stator 1 for an electric machine having a stator body 2 and a hairpin winding 5 applied thereto. In FIG. 1, the cylindrical stator 2 is partially rolled up, so that in the transverse direction in FIG. 1 stator teeth 3 protruding in the radial direction from stator body 2 and grooves 4 located between them alternate. For reasons of clarity, only two conductor portions 7, 8 of a phase 6 are shown in FIG. 1, which, as will be explained below with reference to FIG. 2, are connected in series. Other conductors or phases are present, but not shown.

The conductor 32 or the conductor portions 7, 8 are each formed by a plurality of conductively connected conductor clips 9 to 12. As shown in the example of the conductor clip 9, respective conductor clips 9 to 12 comprise two groove portions 15, 16 which are routed through a respective groove 4 of the stator body 2, and a connecting portion 17 which connects the groove portions 15, 16. When applying the hairpin winding, the groove portions 15, 16 are initially straight, so that the conductor clips 9 to 12 can be inserted axially into the stator body 2. After insertion, the free ends of the conductor clips 9 to 12 are first bent, with all free ends on one layer always being bent in the same direction and free ends on adjacent layers being bent in different directions. Then, the free ends, as shown schematically at the connection points 13, 14, are conductively connected, for example welded.

The various poles 22, 23, 27, 28 of the respective phase 6 are each formed by a plurality of groups of groove portions 20, 21, with the respective group of groove portions 20, 21 comprising groove portions 15, 16 which are arranged in the same layer of the hairpin winding 5 in a certain group of grooves 18, 19 of grooves 4. As can be seen in FIG. 1, the connecting portions 17 of the respective conductor clips 9 to 12 each connect groove portions 15, 16 of different groups of groove portions 20, 21 or different poles 22, 23, 27, 28. Grooves 33 between the group of grooves 18, 19 can accommodate groove portions for forming other phases.

The shape of the respective conductor clip 9 to 12 specifies a skip width 24, 25, 26, which indicates the number of skipped grooves between the groove portions 15, 16 of the respective conductor clip 9 to 12. Thus, the skip width for conductor clip 9 is four, for conductor clip 11 it is six and for conductor clips 10, 12 it is five in each case. Those conductor clips 9 and 11 or 10 and 12, which connect adjacent poles, i.e. poles 22 and 23, or 27 and 28, are considered to be a group of connector clips. An essential feature of stator 1 is that the group of conductor clips comprising conductor clips 9, 11 has a different combination of skip widths, namely skip widths 4 and 6, than the group of conductor clips comprising conductor clips 10 and 11. As will be explained below with reference to FIG. 2, this makes it possible to connect conductor portions 7, 8 in series in order to form conductor 32.

FIG. 2 shows a detailed view of a winding scheme of stator 1, wherein only the scheme for layers A and B, i.e. the outermost two winding layers or the outermost basket of the winding, for conductor 32 is provided. The numbers indicated in the boxes number the groove portions, starting from the phase connection, which is marked with one, in the order in which they are connected to one another. Here, straight lines between boxes or numbers indicate connection via connecting portions 17 on the bending side, and stepped connections indicate connection via welded joints or the like on the welding side. A respective column represents a respective groove and a respective row represents a layer. In this case, only boxes for the grooves occupied by groove portions of the one phase are shown, and the grooves that accommodate conductors of other phases are shown abstractly as horizontal gaps. The empty boxes carry a second conductor of the same phase that uses the same winding scheme. In layers C to F that are not shown or only partially shown, the same winding scheme is continued.

For the conductor clips or connecting portions, apart from the conductor clips or connecting portions shown in dashed lines, a combination of a skip width of four for an inner conductor clip and a skip width of six for an outer conductor clip is used throughout. A skip width of five is utilized for the two conductor clips or connecting portions shown in dashed lines. As a result, during a normal twisting procedure, the free ends of groove portion 8 in layer B and of groove portion 9 in layer A come to lie adjacent to one another and can thus be conductively connected in order to conductively connect the conductor portion that comprises groove portions 1 to 8, to the conductor portion, that comprises groove portions 9 to 16. As a result, the resulting conductor within the basket of the winding formed by the two layers A and B is routed twice in the same direction about the central axis of the stator in the circumferential direction of the stator. After reaching groove portion 16, the conductor is routed to another basket as usual, namely to layer C, by conductively connecting groove portion 16 to groove portion 17.

If the winding scheme shown in FIG. 2 would be modified in such a way that same combination of skip widths would be used for the connection portions or conductor clips shown in dashed lines as for the other groups of conductor clips utilized between two poles, i.e. skip widths six and four in the example, this would result in the groove portions designated 8 and 16 in FIG. 2 being interchanged. Due to the fixed skip width on the welding side due to the twisting procedure, this would result in that the free end of the eighth groove portion would come to lie adjacent to the free end of the groove portion designated 17 in FIG. 2 in layer C and thus the conductor would be routed into the next basket, i.e. into layer C, directly after one turn about the central axis of the stator. The second conductor portion comprising groove portions 9 to 16 in FIG. 2, would in this case also be routed directly into the second basket, so that instead of these conductor portions being connected in series, the conductor portions would be part of parallel conductors.

In other words, by selecting the combination of skip widths for the conductor clips shown in dashed lines, optionally a longer individual winding or two parallel windings can be implemented. This means that the number of windings can be modified with little effort during manufacture, which can be used, for example, to adapt stators of different lengths to the electrical boundary conditions of a system in which they are to be utilized.

Figure 3:
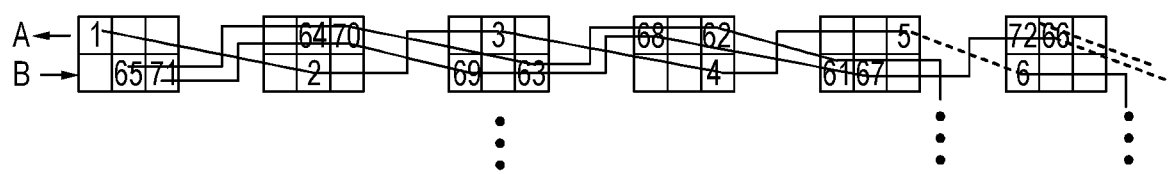
FIG. 3 shows a section of the winding scheme for conductors in a further exemplary embodiment of a stator according to the invention.
Figure 4:
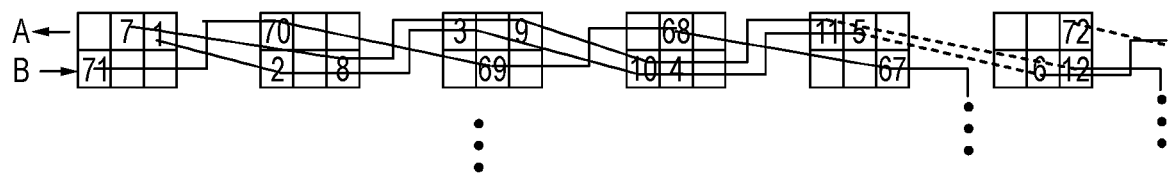
Figure 5:
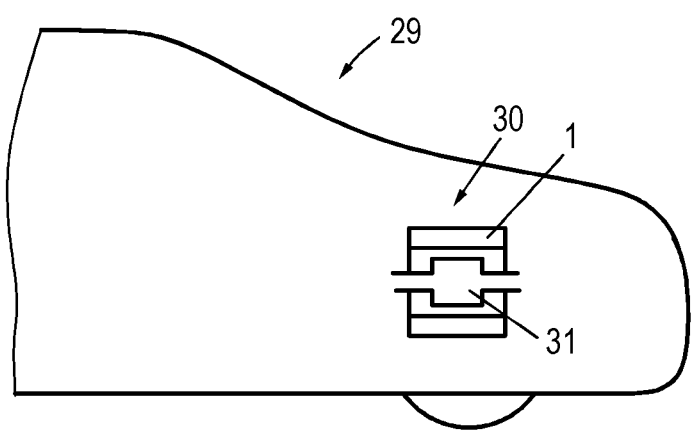
FIG. 5 shows an exemplary embodiment of a motor vehicle according to the invention, which comprises an exemplary embodiment of an electric machine according to the invention.

FIGS. 3 and 4 show portions of the winding scheme for two conductors of the same phase of another electric machine. In general, what was said about FIG. 2 applies with regard to the selected representation of the winding scheme. As already in FIG. 2, the numbers in the boxes indicate the numbering of groove portions involved, starting from a phase connection. In this case, both in FIG. 3 and in FIG. 4, the respective conductor is routed from layer A to a layer F (not shown) and from there back to layer A, so that groove portion 72 is also in layer A, which groove portion 72 is furthest away from the phase connection and can be connected to a ground or a star point, for example. Due to this configuration, the three conductor clips of a respective group of conductor clips connecting two of the poles are distributed over the two conductors, so that both figures should be considered together for discussion of the combinations of skip widths utilized.

All conductor clip combinations that each connect two poles, apart from the conductor clips shown in dashed lines that connect three poles, have a combination of skip widths of nine, nine and six in the example. The two groups of conductor clips shown in dashed lines have a combination of skip widths of ten, eight and six. This ensures in FIG. 1 that the conductor portion extending from groove portion 61 to groove portion 72 and in FIG. 4 that the conductor portion extending from groove portion 1 to groove portion 12 are routed twice in each case in the same direction about the central axis of the stator.

If the same combinations of skip widths were also utilized for the conductor clips shown in dashed lines as for the other conductor clips, three parallel conductors would result instead, which are routed only once about the central axis of the stator in the circumferential direction within a respective basket. Thus, similar to the exemplary embodiment already discussed with respect to FIGS. 1 and 2, a different number of turns can be achieved by utilizing a different variation or combination of the skip widths of at least two groups of conductor clips than if the same combination of skip widths is used for all groups of conductor clips. Accordingly, the number of turns can be adjusted with little technical effort.

FIG. 4 shows an exemplary embodiment of a motor vehicle 29, which comprises an electric machine 30, which is formed by one of the previously explained stators 1 and a rotor 31. The electric machine 30 can in particular be a drive motor of an electric vehicle or hybrid vehicle.

The invention claimed is:

1. A stator for an electric machine comprising:
   a stator body with a plurality of grooves distributed in a circumferential direction of the stator body,
   a hairpin winding applied to the stator body, and
   conductors for a plurality of phases, each of the conductors being formed by a plurality of conductively connected conductor clips,
   wherein each of the conductor clips has two groove portions, each of the two groove portions are connected by a connecting portion, and a shape or size of the conductor clip determines a skip width of the conductor clip such that the skip width defines how many grooves are skipped in the circumferential direction between the two groove portions,
   wherein a respective pole of the plurality of phases is formed by a plurality of pairs of groove portions, such that each of the plurality of pairs of groove portions comprise groove portions arranged in adjacent grooves in a same layer of the hairpin winding,
   wherein the conductor clips constituting the plurality of pairs of groove portions forming the respective pole thereby form a group of conductor clips, such that the group of conductor clips connects adjacent poles of a respective phase of the plurality of phases,
   wherein, in the circumferential direction, there are a number of skipped grooves between the two groove portions of each of the conductor clips as defined by the skip width of the conductor clip, and
   wherein at least two of the groups of conductor clips have a different variation or combination of skip widths,
   wherein at least one conductor of at least one phase within a basket of the hairpin winding is formed by two layers of the hairpin winding in routed twice in a same direction about a central axis of the stator in the circumferential direction.

2. The stator according to claim 1, wherein only those groups of conductor clips that connect exactly two or exactly three poles of the respective phase have a different variation or combination of skip widths than other groups of conductor clips of the respective phase.

3. The stator according to claim 2, wherein the groups of conductor clips that connect exactly two or exactly three poles of the respective phase have a same skip width, and
   wherein the skip widths of two conductor clips of the other groups of conductor clips each differ by two.

4. The stator according to claim 2, wherein the groups of conductor clips that connect exactly two or exactly three poles of the respective phase each comprise at least three conductor clips,
   wherein the skip widths of two of the at least three conductor clips differ by four or more, and
   wherein the skip widths of the conductor clips of the other groups of conductor clips differ by a maximum of three.

5. The stator according to claim 2, wherein the skip widths of two conductor clips of the groups of conductor clips that connect exactly two or exactly three poles of the respective phase each differ by two, and
   wherein the skip widths of two conductor clips of the other groups of conductor clips are the same.

6. The stator according to claim 2, wherein the groups of conductor clips that connect exactly two or exactly three poles of the respective phase each comprise at least three conductor clips, and
   wherein the skip widths of two of the at least three conductor clips differ by a maximum of three, and
   wherein the skip widths of the conductor clips of the other groups of conductor clips differ by four or more.

7. The stator according to claim 1, wherein the stator further comprises an electric machine.

8. The stator according to claim 7, wherein the electric machine forms a part of a motor vehicle.

9. A method for applying a hairpin winding to a stator body having conductors for a plurality of phases, comprising:
   providing a stator body having a plurality of grooves distributed in a circumferential direction of the stator body,
   providing a plurality of conductor clips, wherein each of the conductor clips have two groove portions, each of the two groove portions are connected by a connecting portion, a shape or size of the conductor clip determines a skip width of the conductor clip such that the skip width defines how many grooves are skipped in the circumferential direction between the two groove portions, and at least two of the plurality of conductor clips have a different size or shape,
   axially inserting the groove portions into corresponding ones of the plurality of grooves to thereby form a respective pole of a respective phase, such that the respective pole comprises a plurality of groups of groove portions, and each of the plurality of groups of groove portions comprise groove portions arranged in groups of grooves from adjacent grooves in a same layer of the hairpin winding, and
   conductively connecting the conductor clips to form the at least one conductor of the respective phase,
   wherein the conductor clips constituting the plurality of pairs of groove portions forming the respective pole thereby form a group of conductor clips, such that the group of conductor clips connects adjacent poles of a respective phase of the plurality of phases, and
   wherein at least two of the groups of conductor clips of the respective phase have a different variation or combination of skip widths,
   wherein the method for applying the hairpin winding to the stator body is used to apply a first hairpin winding to a first stator body of the stator body and a second hairpin winding to a second stator body of the stator body, and
   wherein a different variation or combination of skip widths is used for the second hairpin winding than the first hairpin winding.

10. The method according to claim 9, wherein the first and second stator body have different lengths in an axial direction of the stator.

11. The method according to claim 9, wherein the method for applying the hairpin winding to the stator body is used to apply a first hairpin winding to a first stator body of the stator body and a second hairpin winding to a second stator body of the stator body, and
   wherein a same variation or combination of skip widths is used for the second hairpin winding than the first hairpin winding.

\* \* \* \* \*